Jan. 14, 1947. L. SPRARAGEN 2,414,341
LEVER OPERATED CONTROL DEVICE
Filed July 20, 1944
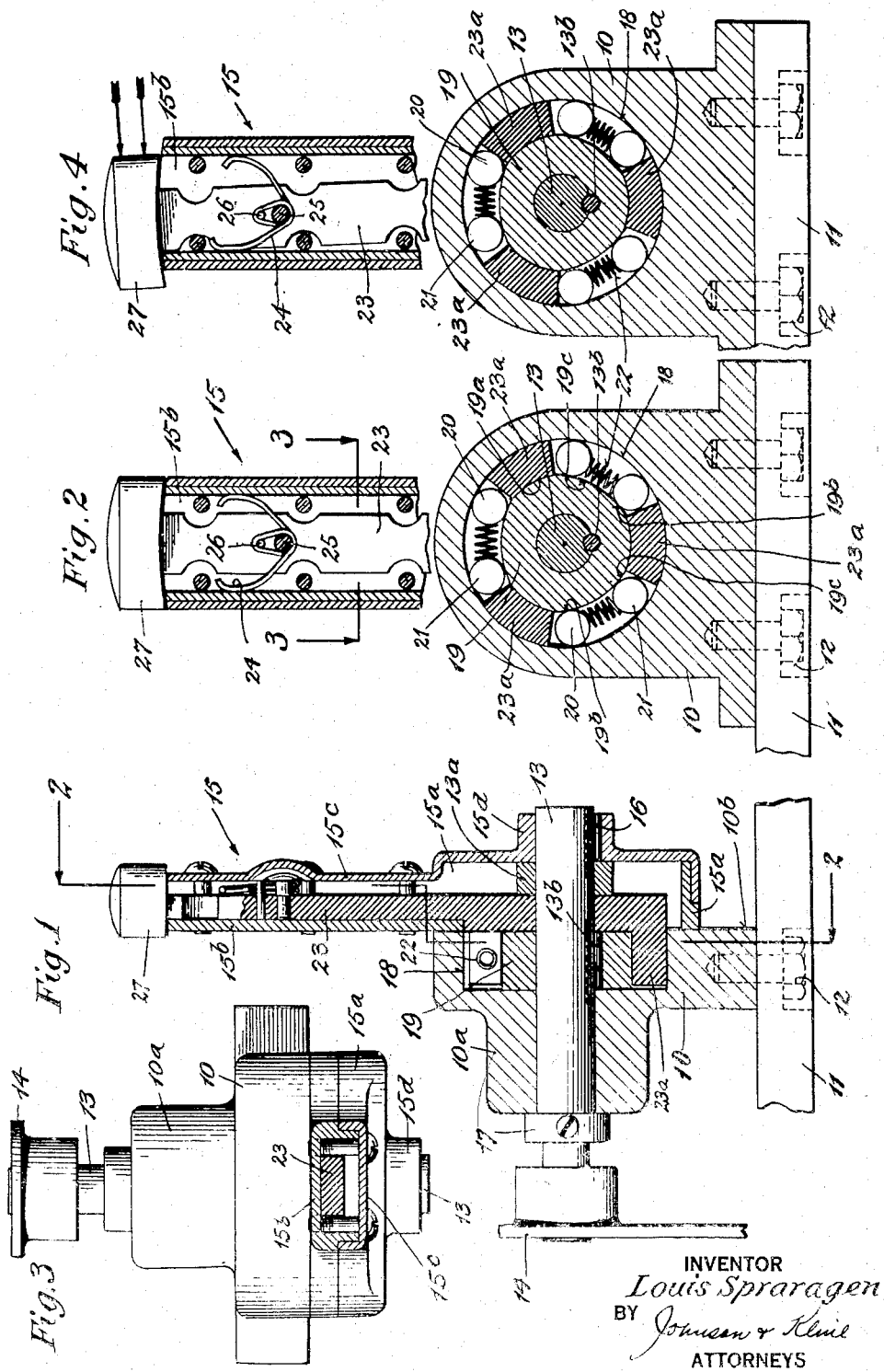
INVENTOR
Louis Spraragen,
BY
Johnson & Kline
ATTORNEYS Patented Jan. 14, 1947

2,414,341

UNITED STATES PATENT OFFICE 2,414,341

LEVER OPERATED CONTROL DEVICE

Louis Spraragen, Bridgeport, Conn., assignor to Automatic Locking Devices, Incorporated, Bridgeport, Conn., a corporation of Connecticut Application July 20, 1944, Serial No. 545,882

12 Claims. (Cl. 74—531)

This invention relates to mechanical control devices, and more particularly to a lever operated control having automatic stepless locking means.

Automatic stepless locking controls, utilizing the action of a race and oppositely located wedging surfaces which are locked together by wedging balls or rollers, have been used in the past for operating movable members, shafts and the like, these controls generally functioning to become automatically unlocked at the initiation of movement of the operable member, and to become automatically locked at the termination of such movement. These controls function satisfactorily in general use where the parts or apparatus to be operated provide a continuously resisting load. However, in certain situations the apparatus is such that during part of its operation it may resist the operating force, and during another part of its operation it may assist or help the operating force. For the latter condition, the control device, while still operative, may chatter more or less severely, so that smooth operation is interfered with.

An instance where such reversible load conditions are met, for example in water and aircraft, is in the rudder control. If the rudder is in straight ahead position and the control as made prior to this invention is operated to deflect it either one way or the other a continuously resisting load will be imposed on the control, and the latter may operate smoothly. If, however, from a deflected position the rudder is moved past the straight ahead position to an opposite deflected position, it will during the first part of this movement tend to assist the force on the control device, and as the latter is unlocked, a chattering action will occur which is undesirable.

An object of the present invention is to overcome the difficulty in these prior devices. This is accomplished by the provision in a stepless locking type of control, of an operable release member which is separate from the operating lever of the control, yet associated with it in such a manner that convenient operation of the lever and automatic locking of the control is possible. The control is unlocked by a movement of the release member, and then operated by the operating lever which has a positive driving connection with the loading apparatus. Variations of the load of the latter affect only the operating lever and not the release member, and therefore the unlocking and locking of the control is not interfered with.

The device illustrated herein as embodying the invention has a shaft rotatable in a housing and automatically locked thereto by opposed wedging rollers which are spring held in their locking positions. A tubular operating lever is rigidly mounted on the shaft and carries within it a release lever which extends beyond the end of the operating lever, the release lever being movable in either of two directions from a centralized locking position. When the release lever is moved in one direction, it unlocks one set of rollers to permit rotation of the shaft by the operating lever in one direction, and reverse movement of the release lever moves the other set of rollers out of their locking position to release the shaft for turning in the other direction.

When the release lever is let go of, it automatically returns to the centralized position wherein the rollers may automatically again lock the shaft from turning. If the apparatus being operated by the shaft should tend to assist rather than resist the rotation of same, this will not cause chattering of the control since the position of the wedging rollers is dependent on the position of the release lever with respect to the operating lever, which position is independent of any forces acting on the shaft, and is controlled entirely by the finger pressure of the operator.

A feature of the invention is the provision of a structure wherein the release lever is entirely enclosed, except for its end, being contained within the tubular operating lever so that these relatively movable parts are free from outside interference.

Other features and advantages will hereinafter appear.

In the accompanying drawing—

Figure 1 is a vertical axial section of the control made according to the invention.

Fig. 2 is a section taken on the line 2—2 of Fig. 1, showing the parts in locking position.

Fig. 3 is a horizontal section taken on the line 3—3 of Fig. 2.

Fig. 4 is a sectional view similar to that of Fig. 2, but showing the lock released for operation of the shaft.

As shown, the control device of this invention comprises a housing 10 rigidly mounted on a base plate 11 by means of cap screws 12. The housing 10 has a bearing portion in the form of a horizontally extending boss 10a which is bored to rotatably carry an operating shaft 13.

One end of the shaft 13 has mounted thereon a lever 14 by which driving movement is imparted to apparatus (not shown) which is to be controlled.

For the purpose of controllably turning the shaft 13 in one direction or another an operating lever 15 is mounted on its other end to extend radially therefrom. The lever 15 is tubular in form, and has a housing 15a having a channel extension 15b, and a cover plate 15c having a hub 15d encircling the end of the shaft 13. The lever 15 is fastened to the shaft 13 for driving same by a key 16, which engages the shaft and hub portion 15d.

As shown in Fig. 1, the housing portion 15a of the lever engages the side wall 10b of the housing 10 for positioning thereby, and separation of these co-engaging parts is prevented by a collar 17 carried on the shaft 13 at the end of the boss 10a.

According to the present invention a stepless automatic locking means operable independently of loading of the shaft 13 is provided within the housing 10. This locking means functions to lock the shaft 13 to said housing, thereby locking the apparatus attached to the lever 14 in any adjusted position.

For this purpose the housing 10 is provided with an internal cylindrical race 18 concentrically located with respect to the shaft 13. Within the race 18 and spaced therefrom is a disk 19 carried by the shaft 13 and rigidly fastened thereto by means of a key 13b.

As seen in Fig. 2, the disk 19 has a cylindrical peripheral surface 19a which is relieved at three equi-spaced intervals, each constituting a pair of oppositely directed wedging surfaces 19b and 19c. Pairs of wedging rollers 20 and 21 are carried between the wedging surfaces of the disk 19 and the race 18 of the housing, the rollers of each pair being yieldably held apart by helical compression springs 22. The diameter of the rollers 20 and 21 is such with relation to the space between the race 18 and the wedging surfaces 19b, 19c that when the rollers are in the position shown in Fig. 2, yieldably held apart by the spring 22, they lock the housing 10 and disk 19 together preventing rotation of the latter and the shaft 13.

For the purpose of moving one or the other of the sets of rollers 20, 21 out of wedging position to release the disk 19 and shaft 13 for movement in one direction or the other, a release lever 23 is provided, rotatably mounted on the shaft 13 and extending through the tubular operating lever 15. The release lever 23 has a plurality of lugs 23a which extend laterally thereof into the spaces between the cylindrical portions 19a of the disk and the race 18. As shown in Fig. 2, the release lever 23 may be centralized within the tubular operating lever 15, there being clearance between the levers so that a limited reversible movement of the release lever is possible. The lugs 23a of the release lever are located so that they do not engage the wedging rollers 20, 21 when the lever is centralized as in Fig. 2. However, if the release lever 23 is moved to the left as shown in Fig. 4, the lugs 23a will engage and move out of wedging position the rollers 20 so that the disk 19 and shaft 13 are released for counterclockwise rotation. Or, if the release lever 23 is moved to the right the lugs 23a will move the rollers 21 out of wedging position, thereby releasing the disk 19 and shaft 13 for clockwise rotation. As shown in Fig. 1, a spacing collar 13a is carried on the shaft between the hub 15d and the lever 23 to maintain alignment of the latter.

For the purpose of yieldably holding the release lever 23 in the centralized position shown in Fig. 2, it is provided with a wire spring 24 secured in place by a stud 25 and pin 26, the latter preventing turning of the body of the spring. The end portions of the spring 24 engage the inner walls of the lever 15, and serve to return the lever 23 to its centralized position whenever it is free to do so. For convenient operation of the release lever 23 the projecting end thereof is provided with a knob 27 substantially conforming to the cross-sectional shape of the operating lever 15.

According to this construction, and again referring to Fig. 2, the shaft 13 is normally locked against rotation in either direction. When it is desired to rotate the shaft for operating apparatus connected to the lever 14, the operating lever 15 is grasped and the knob 27 moved from its centralized position in the direction in which the lever 15 is to be moved. This operates the release lever 23 and releases one or the other of the sets of rollers 20, 21 whereupon the operating lever 15 may be moved to obtain the desired change of condition. Locking of the shaft 13 is then automatically accomplished by the operator merely releasing the knob 27, the latter automatically being returned together with the lever 23 to centralized position by the spring 24, and the released rollers being automatically returned to wedging position by the springs 22.

It will be noted that the releasing of either set of rollers is dependent entirely upon the relative positions of the levers 15 and 23, and is independent of any force which might be transmitted to the shaft 13 through the driving lever 14. As a result the operation of the control is free from chatter at all times and the locking is stepless, in contradistinction to the stepped action obtained from ratchets and the like.

Since the locking and releasing mechanisms are entirely enclosed the control device is trouble-free in operation and not likely to be adversely affected by such factors as dust, dirt, etc.

Variations and modifications may be made within the scope of the invention and portions of the improvements may be used without others.

I claim:

1. A control device comprising a housing; a shaft rotatably mounted in the housing; means for automatically locking the shaft to the housing against turning in one direction; means for automatically locking the shaft to the housing against turning in the other direction; a lever directly connected to drive and control the rotation of the shaft; a manually operable member mounted for limited movement in either of two directions with respect to the lever and operable independently of the operation of said lever; means for yieldably holding the operable member in a position intermediate the limits of its movement; and means for releasing one or the other of said locking means when the operable member is moved from said intermediate position toward one or the other of the limits of its movement and held in such position so that the lever may be operated to unidirectionally rotate the shaft, said operable member returning to intermediate position and said locking means becoming operative again to automatically lock the shaft when the operable member is released, said manually operable member being positioned adjacent the end of the lever which is grasped by the hand to move the same so as to be engageable by the same hand and operated thereby.

2. A control device comprising a housing; a shaft rotatably mounted in the housing; means for automatically locking the shaft to the housing against turning; a tubular operating lever mounted on the shaft for turning same; a release lever pivotally mounted on the shaft, extending through and projecting from the operating lever, and movable between two limiting positions with respect to the latter; spring means located within the tubular lever, engaging same and the release lever for yieldably holding the latter in a position intermediate said two positions; and means for releasing said locking means when the release lever is moved to one or the other of said limiting positions respectively, to release the shaft and permit the operating lever to turn same, said spring means automatically returning the release lever to intermediate position, and said locking means becoming operative again to automatically lock the shaft when the release lever is let go of.

3. A control device comprising a housing; a shaft rotatably mounted in the housing; means for automatically locking the shaft to the housing against turning in one direction; a tubular operating lever mounted on the shaft; a release lever pivotally mounted on the shaft, extending through and projecting from the operating lever, and movable between two positions with respect to the latter; means for yieldably holding the release lever in one of said positions; and means for releasing said locking means when the release lever is moved to the other of said positions, to thereby release the shaft and permit the operating lever to rotate same, said release lever automatically returning to said one position and said locking means becoming operative again to automatically lock the shaft when the release lever is let go of.

4. A control device comprising a substantially tubular housing divided transversely, having bearings at each end and a shaft extending through said bearings, one part of the housing having a cylindrical bore and being rotatable with respect to the other part, said other part being fastened rigidly to said shaft; a tubular operating lever carried by said other housing part, extending substantially radially therefrom; a disk fastened to the shaft and located within the said cylindrical bore of the one housing part, having a periphery spaced from the bore and relieved to provide a wedging surface; a wedging means located between the wedging surface of the disk and the said housing bore; means for yieldably holding the wedging means in wedging engagement with the disk and said one housing part to lock the disk and shaft to the latter; and means, including a manually operable release lever pivotally mounted on the shaft, extending through and projecting from the operating lever, for moving the wedging means out of said wedging position when said release lever is moved, so that the disk and shaft are released for rotation, said wedging means automatically returning into wedging engagement with the disk and one housing part to lock the disk and shaft, upon release of the manually operable lever.

5. A control device comprising a substantially tubular housing divided transversely, having bearings at each end and a shaft extending through said bearings, one part of the housing being rotatable with respect to the other part, said other part being fastened rigidly to said shaft; a tubular operating lever carried by said other housing part, extending substantially radially therefrom; means located within the said one housing part for locking the shaft to same; and means, including a manually operable release lever pivotally mounted on the shaft, extending through and projecting from the operating lever, for releasing said locking means when said release lever is moved, so that the shaft is released for rotation, said locking means automatically becoming operative to lock the shaft upon release of the manually operable lever.

6. A control device comprising a substantially tubular housing divided transversely, having bearings at each end and a shaft extending through said bearings, one part of the housing being rotatable with respect to the other part, said other part being fastened rigidly to said shaft; a channel-section operating lever carried by said other housing part, extending substantially radially therefrom; means located within the said one housing part for locking the shaft to same; means, including a manually operable release lever pivotally mounted on the shaft, extending along the channel of the operating lever, and projecting from the end of the latter, for releasing said locking means when said release lever is moved, so that the shaft is released for rotation, said locking means automatically becoming operative to lock the shaft upon release of the manually operable lever; and an elongate cover plate attached to the operating lever for closing over the channel thereof, to enclose the said release lever.

7. A control device comprising a substantially tubular housing divided transversely, having bearings at each end and a shaft extending through said bearings, one part of the housing having a cylindrical bore and being rotatable with respect to the other part, said other part being fastened rigidly to said shaft; a lever carried by said other housing part, extending substantially radially therefrom; a disk fastened to the shaft and located within the said cylindrical bore of the one housing part, having a periphery spaced from the bore and relieved to provide a wedging surface; a wedging means located between the wedging surface of the disk and the said housing bore; means for yieldably holding the wedging means in wedging engagement with the disk and said one housing part to lock the disk and shaft to the latter; and means, including a manually operable member movable with respect to the lever, for moving the wedging means out of said wedging position when said member is moved, so that the disk and shaft are released for rotation, said wedging means automatically returning into wedging engagement with the disk and one housing part to lock the disk and shaft, upon release of the manually operable member.

8. A control device comprising a housing; a shaft rotatably mounted in the housing; means for automatically locking the shaft to the housing against turning in one direction; means for automatically locking the shaft to the housing against turning in the other direction; a lever connected to drive and control the rotation of the shaft; a knob mounted on the end of the lever for limited movement in opposite directions with respect thereto, the knob lying in the plane of the lever and the line of movement of the knob being substantially the same as the line of movement of the lever end; means for yieldably holding the knob in a position intermediate the limits of its movement; and means for releasing one or the other of said locking means when the knob is moved from said intermediate position toward one or the other of the limits of its movement and maintained in said position independently of the driving of the shaft so that the lever may be then operated in the direction of movement of the knob to rotate the shaft, said knob returning to intermediate position and said locking means becoming operative again to automatically lock the shaft when the knob is released.

9. A control device comprising a housing and a shaft rotatably mounted in the housing, each having juxtaposed parts, one of said parts having a track and the other a wedging surface spaced from and inclined to the track; a wedging means, and means for yieldably holding same in wedging engagement with the track and wedging surface to prevent rotation of the shaft in the housing; a tubular operating lever mounted on the shaft to operate same; a release lever pivotally mounted on the shaft, extending through and projecting from the operating lever and movable between two positions with respect to the latter; means for yieldably holding the release lever in one of said positions; and means for moving the wedging means out of wedging position when the release lever is moved to the other of said positions, to thereby release the shaft and permit the operating lever to turn same, said release lever automatically returning to said one position and said wedging means automatically returning to its wedging position to lock the shaft when the release lever is let go of.

10. A control device comprising a housing and a shaft rotatably mounted therein, each having juxtaposed parts, one of said parts having a track and the other a pair of oppositely directed wedging surfaces spaced from and inclined to the track; a pair of wedging means located between said wedging surfaces and track; means for yieldably holding the wedging means in wedging engagement with the track and wedging surfaces to prevent rotation of the shaft in the housing; a tubular operating lever mounted on the shaft; a release lever pivotally mounted on the shaft, extending through and projecting from the operating lever, and movable between two limiting positions with respect to the latter; means for yieldably holding the release lever in a position intermediate said two positions; and means for moving one or the other of the wedging means out of its wedging position when the release lever is moved to one or the other of said limiting positions respectively, to release the shaft and permit the operating lever to turn same, said release lever automatically returning to intermediate position and said wedging means automatically returning to wedging position to lock the shaft when the operable member is let go of.

11. A control device comprising a housing having an internal cylindrical race; a shaft rotatably mounted in the housing, extending through the race along the axis thereof; a disk fastened to the shaft and located within the race of the housing, the periphery of the disk being spaced from said race, and having oppositely directed wedging surfaces approaching the latter; a pair of wedging rollers located between the wedging surfaces and race; means for yieldably holding the rollers in wedging engagement with the race and wedging surfaces to prevent rotation of the disk and shaft in the housing; a tubular operating lever mounted on the shaft to operate same; a release lever pivotally mounted on the shaft, extending through and projecting from the operating lever, and movable between two limiting positions with respect to the latter; means for yieldably holding the release lever in a position intermediate the said two positions; and means for moving one or the other of said wedging rollers out of its wedging position when the release lever is moved from said intermediate position toward one or the other of said limiting positions respectively, to thereby release the disk and shaft and permit the lever to turn same, said release lever returning to intermediate position and said wedging roller returning to its wedging position to automatically lock the disk and shaft when the release lever is let go of.

12. A control device comprising a housing and a shaft rotatably mounted therein, each having juxtaposed parts, one of said parts having a track and the other a pair of oppositely directed wedging surfaces located on the same side of and spaced from and inclined to the track; a pair of wedging means located between said wedging surfaces and track; means for yieldably holding the wedging means in wedging engagement with the track and wedging surfaces to prevent rotation of the shaft in either direction in the housing; a lever connected to drive and control movement of the shaft; a manually operable member mounted for movement between two limiting positions with respect to the lever; means for yieldably holding the operable member in a position intermediate said two positions; and means for moving one or the other of the wedging means out of its wedging position when the operable member is moved to one or the other of said limiting positions respectively, to thereby release the shaft and permit the lever to turn same, said operable member being free of any driving action on the shaft and automatically returning to said intermediate position and said wedging means automatically returning to its wedging position to lock the shaft when the operable member is released.

LOUIS SPRARAGEN.